Patented July 28, 1936

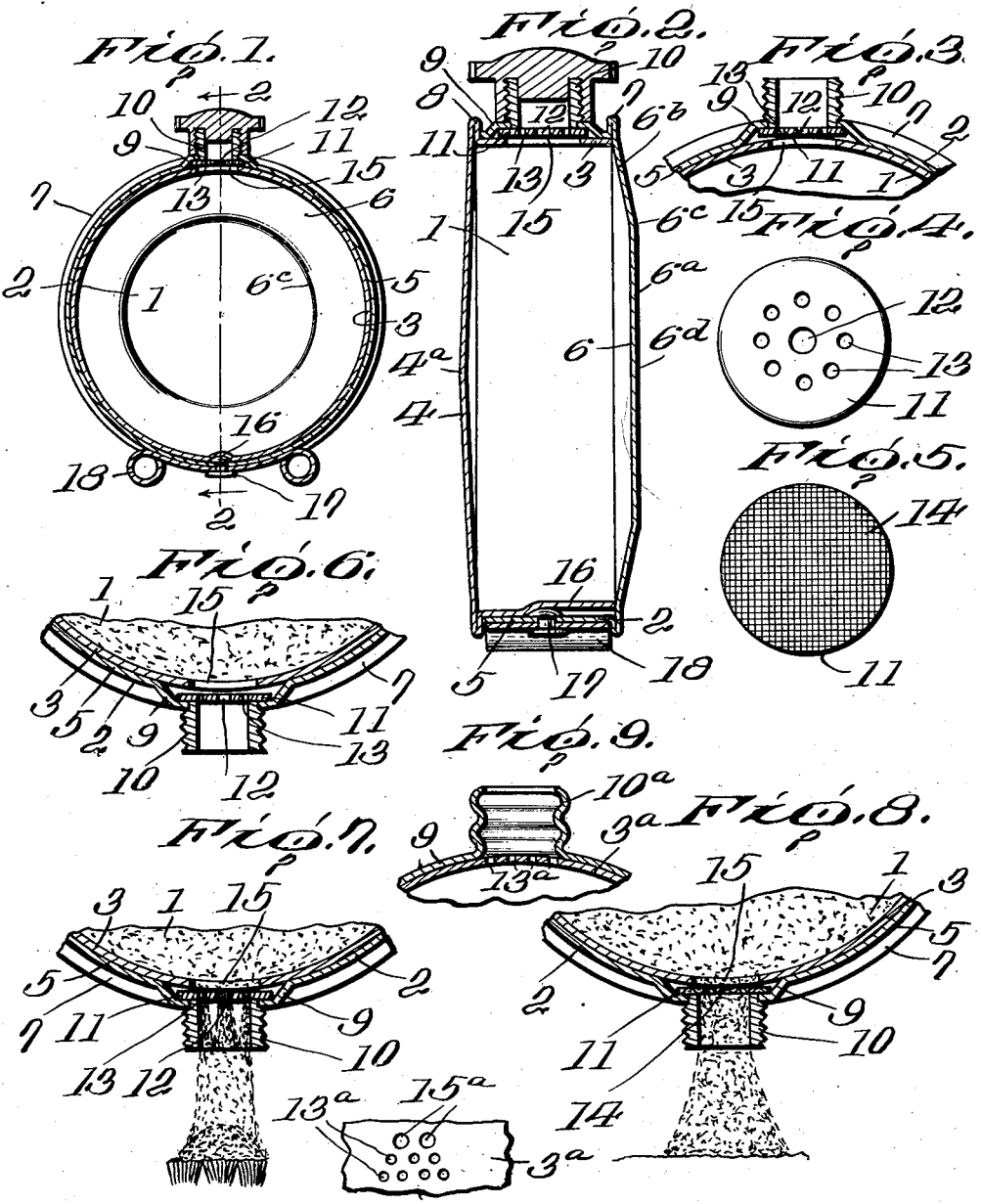

2,048,698

UNITED STATES PATENT OFFICE 2,048,698

DISPENSING CONTAINER FOR POWDERED PRODUCTS

Charles A. Howell, Chicago, Ill., assignor of one-half to Taylor Strawn, Chicago, Ill.

Application June 26, 1935, Serial No. 28,546

6 Claims. (Cl. 221—61)

The invention relates to new and useful improvements in a container for dispensing powdered products such as tooth powder, denture powder and the like.

An object of the invention is to provide a dispensing container which may be cheaply made and wherein a powder may be forcibly expelled therefrom through a discharge nozzle having means for controlling the distribution of the powder.

These and other objects will in part be obvious and will in part be hereinafter more fully disclosed.

In the drawing—

Figure 1 is a vertical sectional view through a dispensing container embodying the improvements;

Fig. 2 is an enlarged sectional view on the line 2—2 of Fig. 1;

Fig. 3 is a vertical sectional view longitudinally of the container through the nozzle and the parts adjacent thereto;

Fig. 4 is a plan view showing one form of screen which is placed at the inner end of the nozzle for controlling the distribution of the powdered material expelled from the container;

Fig. 5 is a plan view showing a different form of screen having a different control upon the distribution of the powdered product.

Fig. 6 is a view showing the container inverted preparatory to expelling a portion of the contents therefrom and showing the screen as retaining the product within the container until air pressure is exerted on the product for expelling the same;

Fig. 7 is a view similar to that shown in Fig. 6 with the screen illustrated in Fig. 4, and the manner of controlling the piling of the powdered product in pyramidal form;

Fig. 8 is a view similar to Fig. 7, but showing the screen illustrated in Fig. 5, and the control thereof on the powdered product;

Fig. 9 is a vertical section through the container at the nozzle showing a modified form of construction, and Fig. 10 is a view of the inner section showing the perforations formed therein.

The invention has to do with a container for dispensing powdered products such as tooth powder, denture powder and the like. The container body is formed of two telescoping sections which are preferably cylindrical in shape and sized so that one slips into the other with a very tight frictional contact between the two which is substantially airtight and which will hold the two sections in engagement with each other, except when they are forcibly separated. Each section contains one of the side walls of the container so that when the two sections are assembled there are two side walls which, in general, are substantially parallel to each other, between which is a comparatively short cylindrical body portion. There is an opening in the outer telescoping section to which a nozzle is attached. This nozzle is preferably threaded to receive a closure cap. The body portion adjacent the nozzle is deflected outwardly so as to provide a recess in which is placed a screen. The screen may be attached in any suitable way to the inner end of the nozzle. The inner telescoping section has an opening which overlies the screen so that the contents within the container may be discharged from the container through the screen. At least one of the walls is shaped like the frustum of a cone with the base extending substantially to the peripheral edge of the wall. The outer end of the frustum terminates in a flat panel. The other wall is preferably slightly bowed or flexed outwardly. The purpose of shaping the walls, as stated, is to permit the inward flexing of the walls for forcibly expelling the product from the container, and through this particular shaping of the container walls, a variable expelling force may be created upon the powdered material.

Referring more in detail to the drawing, the container body includes an inner telescoping section 1 and an outer telescoping section 2. The inner telescoping section has a cylindrical portion 3 rigidly attached to the side wall 4. These parts are preferably drawn from a single piece of metal and are integrally attached. The wall 4, as shown, has a slight outward flexure. The outer telescoping section includes a similar cylindrical portion 5 which is connected to the side wall 6. These parts are likewise preferably formed from a single piece of metal by drawing, and they are, therefore, integrally connected. The wall 6 and the cylindrical portion 5 are preferably shaped so as to provide a circumferentially projecting rib 7. The wall 4 and the body portion 3 are likewise shaped so as to provide a circumferentially projecting rib 8. These ribs 7 and 8 are substantially parallel. The wall 6 has a central flat panel portion 6a. Between this flat panel portion 6a and the peripheral rib 7 is a portion 6b which is normally in the shape of the frustum of a cone, with the base of the cone merging into the rib and the top of the cone integrally connected to the panel 6a.

The body portions 3 and 5 are so dimensioned that they have a telescoping frictional fit. These sections are of substantially the same length, and one telescopes within the other until the edge of the outer section contacts with the rib 8 or the edge of the inner section 3 contacts with the wall 6. When thus assembled, the container is substantially airtight.

The outer telescoping section 5 has a raised portion 9 to which a nozzle 10 is attached. This raised portion provides a recess within the outer section 5 of the container which serves the double function of providing a housing for a screen which is indicated at 11 and also the function of a recess into which the last portion of the contents of the container may pass and be expelled from the container. The screen 11 may be attached to the inner end of the nozzle in any suitable way, by cementing or by soldering, as seems best. This screen as shown in Fig. 4, is provided with a central opening 12 and a series of openings 13 surrounding the same. The central opening 12 is relatively made larger than the openings 13. These openings are all dimensioned so that when the container is inverted and placed in the position shown in Fig. 6, the contents will not pass by gravity through the screen. When, however, one or both of the side walls are pressed upon, the metal will flex inwardly and this will place the air on the container under pressure, forcing it against the material resting on the screen and thus forcing a certain quantity of the material out through the openings in the screen. If the wall 6 is pressed upon at the point 6c, as indicated in Fig. 2, only a small portion of the wall will be bent inwardly; that is, the portion between the circumferential rib 7 and the center of the panel. If, however, pressure is brought to bear at the point 6d, then the whole wall will be flexed inwardly. Then again, if pressure is brought to bear upon the wall 4 at the point 4a, it will be flexed inwardly throughout substantially the entire extent. By these various points of flexing of the walls, a variable air pressure can be obtained so that the powder may be ejected with considerable force or with less force, as desired. When a screen of the type shown in Fig. 4 is used, the powder will be ejected from the central large opening to a greater extent than from any one of the small openings, and thus the piling of the powder in pyramidal form is accomplished. When dispensing tooth powder, the continued expelling of the same may be accomplished by the flexing of the side walls and thus a piling of the powder along the tooth brush to just the desired extent, without any excess of powder being thrown over the sides of the tooth brush, may be accomplished. When the pile approaches the height desired, a small amount of powder may be added by pressing on the side 4a or upon the wall 6 at the point 6c, or some other point similarly disposed relative to the circumference of the wall.

In Fig. 5 of the drawing, a screen 11 is shown which is formed of woven wire so that there are a multitude of openings indicated at 14 in the drawing. When such a screen is used and the powder forcibly expelled through the screen, it will be uniformly distributed over a surface. This is especially useful in connection with the dispensing of denture adhesive powder where it is desirable to distribute it uniformly over the denture. Here again, by varying the force of the air expelling the powder, it may be very lightly spread or thickly spread, if desired.

By placing the screen at the inner end of the nozzle, the nozzle concentrates and controls the field of distribution. Furthermore, it prevents the powder from being packed on to the screen as would occur if the screen were at the outer end of the nozzle. The wall of the inner section of the body portion 3 is provided with an opening 15 which is so dimensioned as to permit the powder to freely pass therethrough into contact with the screen. The wall of the inner section adjacent the opening preferably overlies the edge of the screen, and prevents its dislodgment from the recess if it should become detached. In order to bring this opening into proper alinement with the screen when the parts are assembled, the inner telescoping section 3 has a raised portion 16 forming a groove which receives the head of a rivet 17 used for attaching the foot portion 18 to the container. This head of the rivet when contacting with the groove will place the opening 15 in proper alinement with the screen when the parts are assembled. The foot piece 18 which is attached to the body portion serves as a rest on which the container may be placed in upright position.

In Fig. 9 of the drawing there is shown a slightly modified form of the invention. The nozzle 10a is formed as an integral part of the outer section. This may be done by drawing and shaping so as to provide the same with a thread for the cap. The inner section 3a is provided with a series of perforations 15a and another series of perforations indicated at 13a (see Fig. 10). The perforations 15a are of larger size than the perforations 13a. When these openings are formed in the inner section, the screen, of course, is not used at the base of the nozzle. These openings serve as a control screen for the powder which is to be dispensed. Instead of forming the screen as an integral part of the inner section, it may be made separate and attached thereto in the manner shown in connection with Figures 1 to 8. When the openings are made relatively large and relatively small in size, and properly disposed relative to each other, this greatly aids in the forming of the powder in a pile when it is discharged on to a surface. In other words, the screen controls the distribution of the powder on the surface on to which it is discharged.

It is obvious that other ways may be used for forming the nozzle and arranging the screen. It is essential, however, that there shall be a discharge nozzle for directing the powder which is dispensed from the container and a screen for controlling the distribution of the powder from the nozzle, which screen is located adjacent the inner end of the nozzle. It is also obvious that the container may be made in other forms than that illustrated. It is essential, however, that it shall be an airtight container, having the walls thereof shaped so that the air may be drawn into the container and expelled therefrom by the flexing of said walls. While the screen in one form of the invention is shown with an enlarged central opening, and in another form with enlarged openings at one side of the smaller openings, and in still another form where the screen consists of a series of uniformly shaped openings, it is understood, of course, that the openings may be greatly varied as to shape, size and location in order that the desired control of the discharge of the powder may be obtained.

While the dispensing container is especially adapted for tooth powder and denture powder it will be understood that it may also be used for powdered products of any kind, or even liquids, wherein it is desired to dispense a portion only of the contents for use at one time. The container is preferably made of metal, except as to the closure cap, and when the container is closed, it is impervious to moisture and will keep the powdered product therein in excellent condition. Inasmuch as the flexing of the side expels air from the container and causes air to be drawn into the container, this will keep the screen clear from clogging, so that the contents may be efficiently dispensed at any time.

It is obvious that many changes in the details of construction may be made without departing from the spirit of the invention as set forth in the appended claims.

Having thus described the invention, what I claim as new and desire to secure by Letters Patent, is—

1. A container for dispensing powdered products comprising two similar sections each of which includes a cylindrical portion and a side wall, said cylindrical portions being dimensioned so as to frictionally engage one within the other for holding the sections assembled and producing a substantially air-tight container, a nozzle carried by and projecting from the cylindrical portion of said outer section, said inner section having a discharge opening through the cylindrical portion thereof in alignment with said nozzle, a screen associated with said nozzle for preventing the discharge of the powdered product by gravity and controlling the distribution of the powdered product when forcibly expelled from the container, one of the side walls of said container being shaped so that it may be flexed for expelling the powdered products from the container.

2. A container for dispensing powdered products comprising two similar sections, each of which includes a cylindrical portion and a side wall, said cylindrical portions being dimensioned so as to frictionally engage one within the other for holding the sections assembled and producing a substantially air-tight container, a nozzle carried by and projecting from the cylindrical portion of said outer section, said inner section having a discharge opening through the cylindrical portion thereof in alignment with said nozzle, a screen at the inner end of said nozzle for preventing the discharge of the powdered product by gravity and controlling the distribution of the powdered product when forcibly expelled from the container, one of the side walls of said container being shaped so that it may be flexed for expelling the powdered product from the container.

3. A container for dispensing powdered products comprising two sections, each of which includes a cylindrical portion and a side wall, said cylindrical portions being dimensioned so as to frictionally engage one within the other for holding the sections assembled and producing a substantially airtight container, a nozzle carried by the cylindrical portion of said outer section, said section adjacent the nozzle being deflected outwardly to form a recess at the base of the nozzle, a screen located in said recess, and a closure for said nozzle, the inner telescoping section having an opening in alinement with said screen, one of the side walls of said container being shaped so that it may be flexed inwardly for expelling the powdered product from the container.

4. A container for dispensing powdered products comprising two sections, each of which includes a cylindrical portion and a side wall, said cylindrical portions being dimensioned so as to frictionally engage one within the other for holding the sections assembled and producing a substantially airtight container, a nozzle carried by the cylindrical portion of said outer section, said section adjacent the nozzle being deflected outwardly to form a recess at the base of the nozzle, a screen located in said recess, and a closure for said nozzle, the inner telescoping section having an opening in alinement with said screen, one of the side walls of said container having a flat central panel and a cone-shaped portion leading from said flat panel to the circumferential edge of the wall whereby said wall by pressure applied at the edge of the panel may be flexed in certain portions only thereof and whereby said wall when pressed at the center of said panel may be flexed throughout the entire extent so that a variable air pressure may be created within the container for expelling the powdered contents thereof.

5. A container for dispensing powdered products comprising two sections, each of which includes a cylindrical portion and a side wall, said cylindrical portions being dimensioned so as to frictionally engage one within the other for holding the sections assembled and producing a substantially airtight container, the outer section having an opening therethrough, a nozzle extending through said opening and connected to said outer section, said section adjacent the nozzle being deflected outwardly to form a recess at the base of the nozzle, a screen located in said recess, and a closure for said nozzle, the inner telescoping section having an opening in alinement with said screen, one of the side walls of said container being shaped so that it may be flexed inwardly for expelling the powdered product from the container, said inner section having a groove formed therein, a foot portion attached to the container, and means carried by the outer section adapted to engage said groove for alining said opening in the inner section with the nozzle carried by the outer section.

6. A container for dispensing powdered products comprising two sections, each of which includes a cylindrical portion and a side wall, said cylindrical portions being dimensioned so as to frictionally engage one within the other for holding the sections assembled and producing a substantially airtight container, the outer section having an opening therethrough, a nozzle extending through said opening and connected to said outer section, said section adjacent the nozzle being deflected outwardly to form a recess at the base of the nozzle, a screen located in said recess, a closure for said nozzle, the inner telescoping section having an opening in alinement with said screen, one of the side walls of said container being shaped so that it may be flexed inwardly for expelling the powdered product from the container, and a foot portion fixedly secured to said outer telescoping section on which said container is supported in an upright position.

CHARLES A. HOWELL.